Feb. 28, 1939.  A. Y. DODGE ET AL  2,149,117
TRANSMISSION
Filed Sept. 5, 1936  2 Sheets-Sheet 2
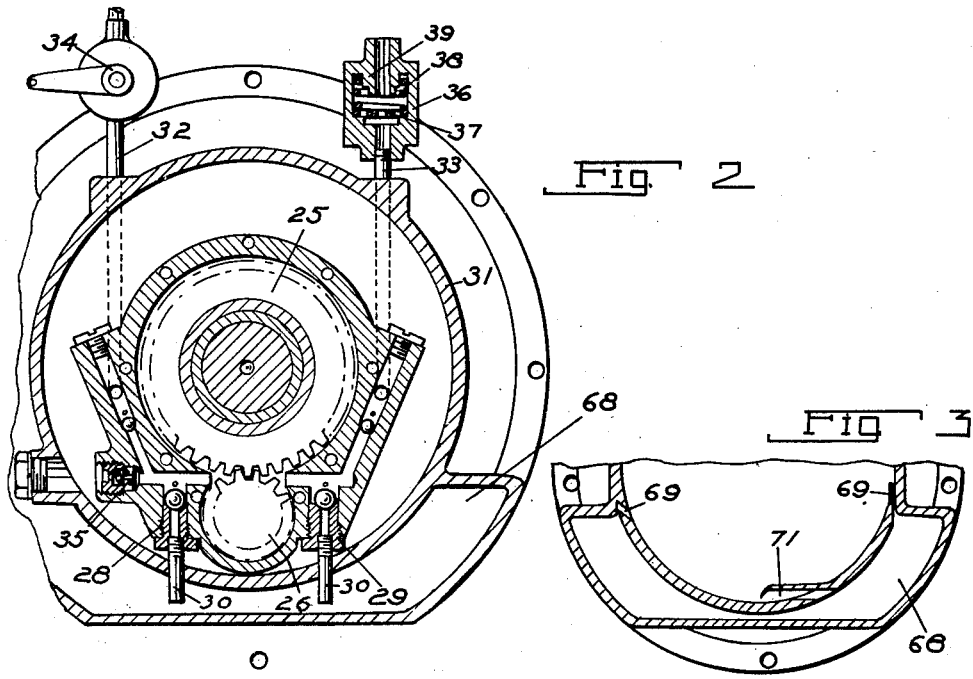
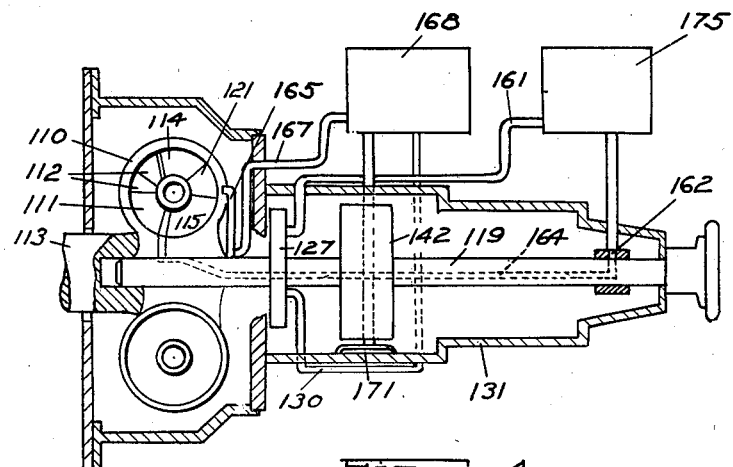
INVENTORS.
ADIEL Y. DODGE
HORACE R. ALLEN
BY McConkey & Booth
ATTORNEYS.

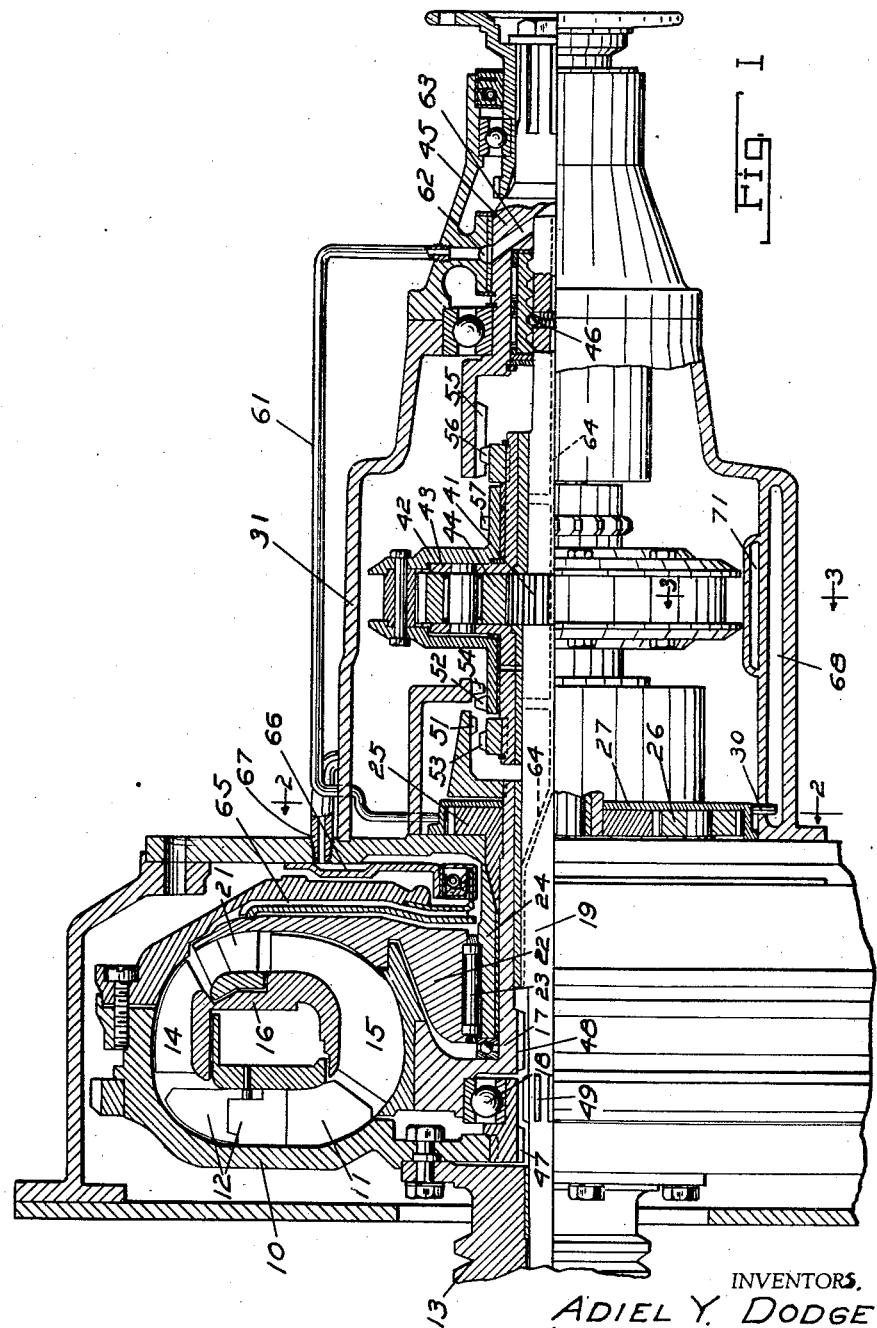

Patented Feb. 28, 1939

2,149,117

UNITED STATES PATENT OFFICE 2,149,117

TRANSMISSION

Adiel Y. Dodge and Horace R. Allen, South Bend, Ind.; said Allen assignor to Bendix Products Corporation, South Bend, Ind., a corporation of Indiana Application September 5, 1936, Serial No. 99,548

8 Claims. (Cl. 60—54)

This invention relates to transmissions and more particularly to transmissions including hydraulic torque converters.

One of the objects of the invention is to provide a transmission including a hydraulic torque converter in which a pump is provided to circulate liquid through the torque converter and in which liquid is discharged from the torque converter against a variable head.

Preferably the pump is a gear pump connected to the driven element or rotor of the torque converter and pumping liquid into the torque converter. The driving element or impeller may be formed with a substantially radial passage so that liquid will be discharged from the converter against a centrifugal head responsive to the impeller speed. This arrangement insures that the torque converter will be maintained full of liquid.

The torque converter is preferably connected to a differential gear unit in such a manner that when the driven member of the gear unit is stationary or turning at very slow speed, the rotor will be turned backwards. The pump is provided with two outlets both arranged to discharge into the torque converter and with suitable check valves so that the discharge will be through one outlet when the pump is turning forwards and through the other when the pump is turning backwards. In order to utilize the pump as a brake, the forward outlet has a manual throttle valve whereby resistance to pump operation can be controlled to facilitate shifting of the gearing connections. A novel flow responsive valve including a spring-pressed perforated disc is provided in the reverse outlet for variably resisting reverse rotation of the pump and rotor thereby to increase the reactionary force tending to prevent reverse rotation of the reactionary gear member, thus increasing the force to turn the driven member of the gear unit forwardly.

The pump preferably draws liquid from a reservoir connected to a gear box enclosing the gear unit by a tangential passage and liquid discharged from the torque converter may pass into the reservoir. The tangential passage is formed adjacent the rotating gears so that swirling of the liquid caused by rotation of the gear unit tends to force the liquid from the gear box into the reservoir. As liquid level in the gear box is reduced, the swirling tendency decreases, thereby permitting liquid to flow from the reservoir into the gear box to maintain a substantially constant quantity of liquid therein. A liquid cooler may be provided in the liquid circuit if desired and is preferably mounted between the pump and the inlet to the torque converter.

Other objects, advantages and novel features of the invention will be apparent from the following description when read in connection with the accompanying drawings, in which:

Figure 1 is an axial cross-section with parts in elevation of a transmission embodying the invention;

Figure 2 is a section on the line II—II of Figure 1;

Figure 3 is a partial section on the line III—III of Figure 1; and

Figure 4 is a diagrammatic view illustrating a modified liquid circuit.

The transmission illustrated comprises an impeller casing 10 having a series of fixed impeller vanes 11 and sets of pivoted vanes 12 and connected to be driven by a shaft 13 which may be the crank shaft of an internal combustion engine or the like. A rotor is mounted in the impeller casing 10 and includes two sets of vanes 14 and 15 connected together by a core member 16 and mounted on a hub 17 which has a bearing at 18 on the end of the shaft 13 and which is journaled on a center shaft 19. A stator including a set of vanes 21, arranged between the rotor vanes 14 and 15 and carried by a hub 22 which is mounted on a combined one way clutch and bearing 23 on a fixed sleeve 24, is also mounted in the casing 10, the impeller, rotor and stator forming a hydraulic torque converter of the type more particularly described and claimed in the copending application of Adiel Y. Dodge Serial No. 57,520.

The rotor hub 17 carries adjacent its end a gear 25 meshing with a gear 26, both gears being encased in a housing 27 to form a gear pump. As best seen in Figure 2, the pump is provided with a pair of inlets 28 and 29 provided with check valves and having inlet pipes 30 to be described later, the entire pump being housed in a liquid tight gear box 31. A pair of outlets 32 and 33 also provided with check valves are connected to the pump and the outlet 32 has a manually controllable throttle valve 34 and a spring pressed pressure relief valve 35. The outlet 33 carries an automatic valve including an enlarged casing 36 in which a perforated disc 37 is slidably mounted, a coil spring 38 serving to urge the disc toward the pump to rest on suitable stops in the casing in a position in which all of the perforations are uncovered. The casing 36 has an outlet 39 forming a seat smaller than the disc 37, so that when the disc is against the seat, a part of the perforations therein will be closed off for a purpose to appear later.

The center shaft 19 is formed with a gear 41 forming the sun gear of a differential planetary unit which includes a ring gear 42 and a planet carrier 43 both sleeved on the shaft 19, the carrier 43 carrying planet gears 44 meshing with the sun and ring gears. The end of the shaft 19 is sleeved in a driven shaft 45 which is journaled in the gear box 31, a suitable spring detent 46 being provided if desired to hold the shafts 19 and 45 yieldingly in any one of a plurality of axial positions.

In order to connect the driving and driven shafts in various driving arrangements, the driving shaft 13 and rotor sleeve 17 carry sets of internal clutch teeth 47 and 48 adapted to engage external teeth 49 on the center shaft 19. The rotor sleeve 17 also carries a set of clutch teeth 51 adapted to engage a set of teeth 52 on the ring gear but to clear a similar set of teeth 53 on the gear carrier. Both sets of teeth 52 and 53 are adapted to engage a stationary set 54 carried by an extension of the gear box 31. The driven shaft 45 is formed with an elongated set of clutch teeth 55 adapted to engage either teeth 56 carried by the gear carrier or teeth 57 carried by the ring gear.

In the position shown in Figure 1, the transmission is in neutral with the torque converter running freely and no driving force being exerted on the driven shaft. For normal forward drive the entire planetary unit and shaft 19 are shifted to the left by means of a suitable yoke, not shown, engaging the ring gear 42 to engage clutch teeth 47 and 49 and 51 and 52, the teeth 55 and 56 remaining in engagement. In this position both the sun gear 41 and the impeller 10 are driven by the driving shaft 13 and the ring gear 42 is driven by the rotor 17, the gear carrier 43 and the driven shaft 45 being driven by the combined effect of the sun and ring gears through an infinite number of speed and torque ratios up to one to one.

It will be noted that if the driven shaft is held stationary or is turning slower than the speed of the driving shaft times the normal ratio of the gear unit, the ring gear and rotor will turn backwards. At this time the gear pump 25, 26, 27 is turning backwards to draw liquid in the inlet 28 and force it out the outlet 33 through the perforations in the disc 37. If such backward rotation is relatively slow, as with the engine idling, a small volume of liquid will be pumped which can pass through the disc 37 without appreciabe resistance. However, if the engine is speeded up, the resistance offered by the disc 37 will cause it to be forced up against the spring 38 to seat on the outlet 39, thereby closing off a part of the perforations in the disc so that it will offer a material resistance to flow and consequently to backward rotation of the rotor and ring gear. This resistance, added to the forward driving torque on the rotor produced by the torque converter, tends to hold the ring gear against backward rotation and provides an extremely high starting torque on the driven shaft.

When the rotor is turning forward, as during normal operation, the pump 25, 26 is also turning forward to draw liquid in the inlet 29 and force it out the outlet 32 past the valve 34 for a purpose to appear later. The valve 34 is normally open but may be closed manually by a pedal similar to a conventional clutch pedal to brake forward rotation of the rotor to facilitate shifting of the gear connections. When the valve 34 is closed, the relief valve 35 will yield to prevent building up of pressure high enough to cause damage to the pump and its associated parts.

To obtain an emergency low gear drive, the gear unit and shaft 19 may be shifted to the right to engage clutches 48 and 49 and 52 and 54, teeth 55 and 56 still remaining in engagement. In this position the ring gear is held stationary and the sun gear 41 is connected to the rotor 17. Thus the planet carrier will be driven by the torque converter and gear unit in series at speeds and torques varying from zero to the ratio of the gear unit.

For a reverse the gear unit and shaft 19 may be shifted farther to the right to engage teeth 53 and 54 and 55 and 57, teeth 48 and 49 remaining in engagement. In this position the gear carrier will be held stationary, the ring gear will be connected to the driven shaft and the sun gear will be connected to the rotor so that the driven shaft will be driven rearwardly by the torque converter and gear unit in series.

According to the present invention the pump 25, 26 serves to circulate liquid through the torque converter and for this purpose the outlets 32 and 39 are both connected by a pipe 61 with an annular cavity 62 in the gear box 31 which communicates through a bore 63 in the driven shaft with the rear end of the shaft 19. The shaft 19 is drilled as at 64, so that liquid may flow longitudinally therethrough and the bore 64 preferably communicates with the bearings by which the ring gear and gear carrier and the rotor sleeve 17 are mounted on the shaft 19 so that these bearings will be lubricated. Liquid flowing through the passage 64 flows through the bearing 18, thus lubricating it, and into the torque converter between the impeller casing 10 and rotor hub 17 to keep the torque converter full.

From the torque converter the liquid may flow out around the stator 22 through radial vaned passages 65 in the impeller casing 10 and through a bore 66 in the gear box into a pipe 67. The passages 65 will cause a centrifugal head to be exerted on the liquid opposing its flow out of the torque converter, thereby keeping the liquid in the torque converter under pressure at all times and insuring that the torque converter will be full of liquid. This is an important feature since the torque converter might become partially emptied if liquid could discharge freely therefrom, thereby resulting in loss of efficiency.

The pipe 67 conducts liquid to a reservoir 68, Figures 2 and 3, which is formed as a lateral extension of the gear box and which communicates therewith through top vent openings 69 and through a tangential opening 71 at the bottom of the gear box. As the gear unit rotates, it sets up a swirl of liquid in the gear box which forces liquid through the tangential opening 71 into the reservoir 68, thereby to reduce the quantity of liquid in the gear box and the drag against rotation of the gear unit. If the level of liquid in the gear box should tend to become too low, the pressure on the opening 71 would be reduced to permit liquid to flow by gravity from the reservoir back into the gear box. The inlet pipes 30 extend through the gear box 31 and into the reservoir to supply the pump with liquid therefrom.

With the transmission operating, liquid will be circulated by the pump at all times regardless of the direction of rotation of the rotor to keep the torque converter full and to lubricate the several bearings. The normal liquid circuit is from the pump through the pipe 61 and the bore 64 in shaft 19 to the torque converter. Pressure of liquid entering the torque converter forces liquid out through the passages 65 against the centrifugal head and through the pipe 67 into the reservoir 68, from which it is again picked up by the pump and recirculated. Liquid flowing through the bearings on shaft 19 will fall directly into the gear box and the level in the gear box will be regulated automatically by the pressure of the swirling liquid on the tangential passage 71.

Figure 4 illustrates diagrammatically a modified arrangement in which parts corresponding to like parts in Figures 1 to 3 have been indicated by the same reference numbers plus 100. In this arrangement a liquid cooler 175 is mounted in the pipe 161 leading from the pump to the rear end of the center shaft 119 to cool the liquid before it is returned to the bearings and the torque converter. While the cooler 175 has not been shown in detail, it is preferably of the air cooled radiator type and will serve to reduce the temperature of the liquid thereby reducing the fire hazard in case a hydrocarbon liquid is employed and otherwise increasing the efficiency of the transmission.

It will be apparent that many changes might be made in the illustrated embodiments, and it is accordingly not intended that the scope of the invention shall be limited to the form shown nor otherwise than by the terms of the appended claims.

What is claimed is:

1. In a transmission, a hydraulic torque converter comprising a driving impeller element and a driven rotor element forming parts of a toroidal hydraulic circuit, a pump for forcing liquid into said torque converter, and a relatively narrow substantially radial liquid outlet passage formed entirely in one of said elements and extending from adjacent its periphery to adjacent its axis whereby discharge of liquid from the torque converter will be resisted proportionally to the speed of rotation of said one element.

2. In a transmission, a hydraulic torque converter comprising a driving impeller and a driven rotor forming parts of a toroidal hydraulic circuit, a pump for forcing liquid into said torque converter, and a substantially radial liquid outlet passage formed entirely in said impeller and extending from adjacent its periphery to adjacent its axis whereby discharge of liquid from the torque converter will be resisted proportionally to the speed of rotation of the impeller.

3. In a transmission, a hydraulic torque converter comprising a driving impeller and a driven rotor forming parts of a toroidal hydraulic circuit, a pump driven by the rotor for forcing liquid into the torque converter, means for throttling the pump discharge thereby to brake the rotor, and a substantially radial liquid outlet passage formed entirely in the impeller and extending from adjacent its periphery to adjacent its axis whereby discharge of liquid from the torque converter will be resisted by centrifugal force.

4. In a transmission, a hydraulic torque converter comprising a driving impeller and a driven rotor forming parts of a toroidal hydraulic circuit, a reversible gear pump driven by the rotor and having two outlets connected to the torque converter to supply liquid thereto, the pump discharging through one outlet when it is rotating forwardly and through the other outlet when it is rotating reversely, and means for variably restricting said other outlet thereby variably to resist reverse rotation of the rotor.

5. In a transmission, a hydraulic torque converter comprising a driving impeller and a driven rotor forming parts of a toroidal hydraulic circuit, a reversible gear pump driven by the rotor and having two outlets connected to the torque converter to supply liquid thereto, the pump discharging through one outlet when it is rotating forwardly and through the other outlet when it is rotating reversely, and an automatic flow responsive valve in said other outlet for variably restricting flow therethrough including a valve chamber of larger diameter than the outlet, a perforated disc in said chamber, means engageable with said disc to close a part only of the perforations therein, and a spring urging the disc away from said last named means.

6. In a transmission, a hydraulic torque converter comprising a driving impeller and a driven rotor forming parts of a toroidal hydraulic circuit, a reversible gear pump driven by the rotor and having two outlets connected to the torque converter to supply liquid thereto, the pump discharging through one outlet when it is rotating forwardly and through the other outlet when it is rotating reversely, a manual throttle valve in said one outlet for variably braking the pump and rotor, a spring pressed relief valve connected to said one outlet to limit the pressure therein, and an automatic flow responsive valve in said other outlet for variably braking reverse rotation of the pump and rotor in response to the rate of flow of liquid through said other outlet.

7. In a transmission having a hydraulic torque converter, a gear pump connected to the torque converter to be driven thereby, said pump having two inlets and two outlets and so constructed and arranged as to discharge through one of the outlets when it is rotating in one direction and the other outlet when it is rotating in the other direction a connection from said outlets to the torque converter to supply liquid thereto, a manual throttle valve in said one outlet, and an automatic flow responsive valve in the other outlet for variably restricting the flow therethrough.

8. In a transmission having a hydraulic torque converter, a gear pump connected to the torque converter to be driven thereby, said pump having two inlets and two outlets and so constructed and arranged as to discharge through one of the outlets when it is rotating in one direction and the other outlet when it is rotating in the other direction a connection from said outlets to the torque converter to supply liquid thereto, a manual throttle valve in said one outlet, and an automatic flow responsive valve in the other outlet for variably restricting the flow therethrough, said automatic valve comprising a valve casing, an outlet pipe of smaller diameter than the casing and projecting into the casing, a perforated disc in the casing adapted to seat on said pipe thereby to close off a part of the perforations, and a spring yieldingly urging the disc away from the pipe, the disc moving into seating engagement with the pipe in response to fluid pressure thereon.

ADIEL Y. DODGE.
HORACE R. ALLEN.